United States Patent [19]

Swicklik et al.

[11] 3,843,817

[45] Oct. 22, 1974

[54] MANUFACTURE OF AQUEOUS PASTE OF SUCCINYLATED MONOGLYCERIDES

[75] Inventors: Leonard J. Swicklik; Lewis G. Jacobs, both of Rochester, N.Y.

[73] Assignee: Eastman Kodak Company, Rochester, N.Y.

[22] Filed: June 14, 1972

[21] Appl. No.: 262,800

[52] U.S. Cl................ 426/342, 426/24, 252/314
[51] Int. Cl........................ A21d 2/32, A21d 2/16
[58] Field of Search......... 99/91; 252/314; 426/342

[56] References Cited
UNITED STATES PATENTS

| | | | |
|---|---|---|---|
| 3,293,272 | 12/1966 | Freund | 99/91 X |
| 3,370,958 | 2/1968 | Freund | 99/91 |
| 3,679,430 | 7/1972 | Birnbaum | 99/91 X |

Primary Examiner—James R. Hoffman
Attorney, Agent, or Firm—Cecil D. Quillen, Jr.; John F. Stevens

[57] ABSTRACT

A process for preparing a stable aqueous paste of a composition including about 15 to 20 percent glyceryl monoesters, about 60 to 65 percent monosuccinylated glyceryl monoesters, about 8 to 12 percent disuccinylated glyceryl monoesters and 6 to 8 percent glyceryl diesters. The paste is prepared by adding the composition to a water phase at about 88° to 90°C. to form a translucent gel-like dispersion, passing the dispersion through a heat exchanger to quickly cool and fluidize it, then passing the dispersion through a scraped surface cooler and collecting the end-product at a cooler outlet temperature of 27° to 30°C.

4 Claims, No Drawings

MANUFACTURE OF AQUEOUS PASTE OF SUCCINYLATED MONOGLYCERIDES

This invention relates to the manufacture of an aqueous paste of a monoglyceride and more particularly, it relates to the manufacture of stable aqueous pastes of half esters of succinic acid of a mono-acylated glycerol.

Succinylated monoglycerides are accepted for use in bread baking to provide improved grain and texture in the final product as well as to improve machineability of bread dough. In this connection see U.S. Pat. No. 3,370,958 issued Feb. 27, 1968, and entitled "Compositions Comprising Succinyl Half Esters." Succinylated monoglycerides are also listed in the Standards of Identity for bread and similar finished materials. These food approved succinylated monoglyceride products are prepared by reacting saturated monoglycerides (C-16 and C-18 saturated fatty acids) with succinic anhydride. In this connection see U.S. Pat. No. 3,293,272 issued Dec. 20, 1966, and entitled "Manufacture of Succinyl Monoglyceride."

Both of the disclosures of U.S. Pat. Nos. 3,293,272 and 3,370,958 are incorporated herein by reference.

In the continuous-mix method of manufacturing bread it has been found satisfactory to add succinylated monoglyceride in bead form to the flake melting tank to provide the bread and processing improvements noted above. However, in the conventional sponge-dough method of manufacturing bread the addition of succinylated monoglyceride in bead form does not provide satisfactory results since there is no point in the dough manufacturing process where the temperature is sufficiently high to melt the beads. Thus, they remain as discrete particles and provide little or no bread or manufacturing improvement. We have found, however, that succinylated monoglycerides in the form of an aqueous paste can be added to the sponge in the conventional bread making process to provide the desired dough conditioning and bread improvement properties.

The preparation of an aqueous paste of succinylated monoglycerides on a laboratory scale has proved to be relatively simple. Surprisingly, however, attempts to prepare such pastes on a large scale (1,000 pounds or more) using the processing schemes devised in the laboratory have not been successful. Invariably these attempts led to an aqueous paste which showed poor emulsion stability (exudation of water) when packaged and stored in standard large size commercial containers.

We have found that a stable aqueous paste of a succinylated monoglyceride can be formed under the critical processing conditions set forth hereinafter.

Accordingly, it is an object of this invention to produce a stable aqueous paste of a succinylated monoglyceride.

Another object of this invention is to produce a stable aqueous paste of a monoglyceride under carefully controlled, critical processing conditions.

An aqueous paste especially useful in the manufacture of bread is produced in accordance with this invention by providing a succinylated monoglyceride having the following composition: 15 to 20 percent glyceryl monoesters; 60 to 65 percent monosuccinylated glyceryl monoesters; 8 to 12 percent disuccinylated glyceryl monoesters, and 6 to 8 percent glyceryl diesters. This composition is added to a lecithin and/or sodium propionate containing water phase at a temperature of 88° to 90°C. forming a translucent gel-like dispersion. The gel-like dispersion is then either initially cooled to 65° to 72°C. and subsequently passed through a scraped surface cooler operated at an outlet temperature of 27° to 30°C. or cooled entirely in the scraped surface cooler to 27° to 30°C. The product resulting from this process is a pourable aqueous paste which after standing for 24 hours at room temperature becomes a homogeneous, unpourable aqueous paste that is stable at ambient conditions and does not exude water on subsequent storage or shipment.

The following examples are intended to further illustrate the invention.

EXAMPLE 1

250 Pounds of succinylated monoglycerides of the reaction of glycerine and fully hydrogenated lard having a composition of 18.3 percent glyceryl monoester; 63.5 percent monosuccinylated glyceryl monoester; 11.7 percent disuccinylated glyceryl monoester, and 6.5 percent glyceryl diesters is melted and held at 67° to 72°C. To a 160 gallon stainless steel, steam jacketed tank is added 739.5 pounds of water, 4 pounds of lecithin (Centrolex F), 0.5 pounds of sodium propionate and the contents heated to 88° to 90°C. with agitation. The molten succinylated monoglyceride is pumped to the tank holding the water phase and a translucent gel-like dispersion forms immediately. When all the succinylated monoglyceride is added to the water phase, the temperature is brought back to 88° to 90°C. and the contents of the tank are pumped through a heat exchanger to bring the temperature to 65° to 72°C. Six pounds of propionic acid are added to the dispersion and the fluid passed into a scraped surface cooler (Votator, shortening-type processing apparatus Model No. 53/4-1F). The product is collected at 275 to 325 pounds per hour from the texturizer unit portion of the Votator at an outlet temperature of 27° to 30°C. The product is a soft, pourable paste and is collected in 50-pound, 100-pound, and 400-pound fiber containers. After standing at ambient conditions for 24 hours, the product is still a soft paste but is nonpourable which is tested for emulsion stability by removing a 10 inch by 2 inch diameter core from the center of either the 400-pound or 100-pound fiber carton. If there is no water visible in the hole 24 hours after the core is removed, the material is considered to have passed the stability test. If water appears in the hole, it is inspected again in 24 hours. If water continues to show, the stability test is considered to have been failed; however, if the water has been reabsorbed the stability test is considered to have been passed. Generally the 48-hour inspection is unnecessary if no water appears within 24 hours after the core is taken. The aqueous dispersion prepared in accordance with this Example No. 1 successfully passes the stability test.

EXAMPLE 2

The exact procedure of Example No. 1 is repeated except that product is collected as follows: One 100-pound container is filled with product produced with the texturizer unit outlet temperature at 35° to 36°C.; one 100-pound container, one 50-pound container, and one 400-pound container are collected with the texturizer unit outlet temperature at 27° to 30°C. The emulsion stability test is performed as described above. The product collected at an outlet temperature of 35° to 36°C. shows 3 inches of water after 24 hours and 48 hours, thus failing the stability test. The containers filled with product produced with the outlet temperature at 27° to 30°C. successfully pass the emulsion stability test.

EXAMPLE 3

The exact procedure of Example No. 1 is repeated except that the succinylated monoglycerides are added as solid beads rather than molten material and, instead of passing the final product through the Votator, it is passed through a heat exchanger and product is collected at 45° to 48°C. All the product thus produced remains soft, slushy and is impossible to core, thereby failing the emulsion instability test.

EXAMPLE 4

The exact procedure of Example No. 1 is repeated except that the product is taken from the texturizer unit outlet at 36° to 40°C. When subjected to the emulsion stability test the 400-pound container, after 48 hours, is found to have 2.5 inches of water in the hole from which the core has been removed, while the 100-pound container is found to have 1 inch of water after 48 hours. Both of these samples are considered to have failed the emulsion stability test.

EXAMPLE 5

To 729.5 pounds of water, 4 pounds of lecithin (Centrolex F) and 0.5 pounds of sodium propionate which are heatd to 88° to 90°C., is added 235 pounds of molten succinylated monoglyceride containing 10 percent glyceryl monoester, 65 percent monosuccinylated monoester, 6 percent disuccinylated monoester, and 19 percent glyceryl diester blended with a glyceryl monoester which is distilled from a reaction mixture of glycerine and fully hydrogenated lard (92 percent glyceryl monoester). This gives an overall fat phase composition which is 19.6 percent glyceryl monoester, 57.5 percent monosuccinylated monoglyceride, 5.4 percent disuccinylated monoglyceride, and 17.5 percent glyceryl diester. The fat phase disperses well in the water phase but without signs of any gelation. The liquid dispersion is cooled to 65° to 70°C. and 6 pounds of propionic acid are added. This dispersion is passed through the Votator described in Example 1 at 270 to 320 pounds per hour and all samples collected from the texturizer outlet at 27° to 30°C. The emulsion stability test is performed but all samples produced in this example failed, illustrating the necessity of having a succinylated monoglyceride having the composition described herein as critical.

While the process in accordance with this invention has been exemplified by succinylated monoglycerides made from distilled monoglycerides of hydrogenated lard, it is to be understood that monoglycerides derived from other fat sources are also applicable. For example, products derived from any fully hydrogenated edible animal fat or vegetable oil such as beef tallow, soybean oil, and cottonseed oil can be utilized.

Further, the aqueous paste can have the following compositions: 69 to 74 percent water, 23 to 27 percent succinylated monoglyceride, 0.4 to 0.6 percent lecithin, 0.5 to 0.7 percent propionic acid, 0.0 to 0.1 percent sodium propionate. Instead of propionic acid other fungicides, such as butyric acid, acetic acid, sorbic acid and the like can be used.

As set forth above, applicants have described a process for producing an aqueous paste of a succinylated monoglyceride. Contrasted with previous attempts to produce such a material the aqueous paste produced in accordance with applicants' invention is stable and does not exude water upon storage. This characteristic is essential for the successful utilization of such a material in the baking industry. It is essential in accordance with applicants' invention that the succinylated monoglycerides have the following composition: 15 to 20 percent glyceryl monoesters, 60 to 65 percent monosuccinylated glyceryl monoesters, 8 to 12 percent disuccinylated glyceryl monoester, and 6 to 8 percent glyceryl diesters. It is also essential that the outlet temperature of the Votator be at 27° to 30°C. and preferably at 30°C.

The invention has been described in detail with particular reference to preferred embodiments thereof, but it will be understood that variations and modifications can be effected within the spirit and scope of the invention.

We claim:

1. A process for producing a stable aqueous emulsion in a paste form comprising the steps of
   A. mixing a composition of, by weight,
      1. 15 to 20 percent glyceryl monoesters,
      2. 60 to 65 percent monosuccinylated glyceryl monoesters,
      3. 8 to 12 percent disuccinylated glyceryl monoesters, and
      4. 6 to 8 percent glyceryl diesters, said monoesters and diesters being derived from saturated fatty acids having from 16 to 18 carbon atoms, with a water phase containing minor amounts of lecithin, sodium propionate or a mixture of lecithin and sodium propionate maintained at a temperature of 88° to 90°C., forming a translucent gel-like dispersion; and
   B. cooling the dispersion in a scraped surface cooler having an outlet temperature of 27° to 30°C. and removing the emulsion so formed as an aqueous paste.

2. A process according to claim 1 wherein the dispersion is initially cooled from 88° to 90°C. to 65° to 72°C.

3. A process according to claim 1 wherein said composition is made from a monoglyceride which is the reaction product of glycerine and a fully hydrogenated lard.

4. A process according to claim 1 wherein said composition is made from a monoglyceride which is the reaction product of glycerine with a fat selected from the group consisting of fully hydrogenated lard, fully hydrogenated edible beef tallow, fully hydrogenated soybean oil, and fully hydrogenated cottonseed oil.

* * * * *